United States Patent
Shukla et al.

(10) Patent No.: US 9,680,964 B2
(45) Date of Patent: Jun. 13, 2017

(54) PROGRAMMING MODEL FOR INSTALLING AND DISTRIBUTING OCCASIONALLY CONNECTED APPLICATIONS

(75) Inventors: Dharma Shukla, Sammamish, WA (US); Abhay Parasnis, Sammamish, WA (US); Raymond Endres, Seattle, WA (US); Arash Ghanaie-Sichanie, Brothell, WA (US); Israel Hilerio, Kenmore, WA (US); Farookh Mohammed, Woodinville, WA (US); Aditya Bhandarkar, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 953 days.

(21) Appl. No.: 12/402,375

(22) Filed: Mar. 11, 2009

(65) Prior Publication Data
US 2010/0235829 A1   Sep. 16, 2010

(51) Int. Cl.
*H04L 29/06* (2006.01)
*G06F 21/00* (2013.01)
*H04L 29/08* (2006.01)

(52) U.S. Cl.
CPC .................. *H04L 67/34* (2013.01)

(58) Field of Classification Search
CPC ......... G06F 21/6218; G06F 2221/2141; G06F 21/31; H04L 63/10; H04L 67/34; H04L 63/08; H04L 63/0823; H04L 63/101
See application file for complete search history.

(56) References Cited

U.S. PATENT DOCUMENTS

| 6,151,599 A | 11/2000 | Shrader et al. |
| 6,233,606 B1 | 5/2001 | Dujari |

(Continued)

FOREIGN PATENT DOCUMENTS

| CN | 101309291 A | 11/2008 |
| WO | 2007083299 A2 | 7/2007 |

OTHER PUBLICATIONS

Watson et al., Probabilistic performance modeling of virtualized resource allocation, May 2010, 10 pages.*

(Continued)

*Primary Examiner* — Thuy Dao
(74) *Attorney, Agent, or Firm* — Cooper Legal Group

(57) ABSTRACT

An application executing in a virtual environment, such as a web browser, may be serviced by an application host, such as a webserver that maintains application resources or provides runtime services to the application. However, it may be difficult to configure the application to operate suitably when the application host is unavailable. Techniques for facilitating such operation include the storing of application resources in a computing environment (such as the local file system or a deployable mesh or cloud environment) while also initiating the application within the virtual environment in the context of the application host, which may reduce difficulties with isolation policies imposed by the virtual environment (e.g., cross-domain restrictions imposed by the web browser.) This configuration may promote the servicing of the application alongside other applications and data objects, e.g., the automated deployment and synchronization of the application among all devices comprising the user's mesh environment.

20 Claims, 9 Drawing Sheets

(56) References Cited

U.S. PATENT DOCUMENTS

| | | | |
|---|---|---|---|
| 6,546,554 B1* | 4/2003 | Schmidt et al. | 717/176 |
| 6,594,682 B2 | 7/2003 | Peterson et al. | |
| 6,615,253 B1* | 9/2003 | Bowman-Amuah | 709/219 |
| 6,725,262 B1 | 4/2004 | Choquier et al. | |
| 7,080,051 B1* | 7/2006 | Crawford | 705/400 |
| 7,219,304 B1 | 5/2007 | Kraenzel et al. | |
| 7,263,712 B2 | 8/2007 | Spencer | |
| 7,272,782 B2* | 9/2007 | Sneh | 715/205 |
| 7,383,405 B2* | 6/2008 | Vega et al. | 711/162 |
| 7,590,733 B2* | 9/2009 | Lum | H04L 61/2015 370/401 |
| 7,594,003 B2* | 9/2009 | Davidson et al. | 709/219 |
| 7,870,596 B2 | 1/2011 | Schackow et al. | |
| 8,082,541 B2* | 12/2011 | Pramanick et al. | 717/130 |
| 8,239,923 B2* | 8/2012 | Kirshnan | G06F 8/67 709/224 |
| 8,543,842 B2* | 9/2013 | Ginter | G06F 21/10 380/225 |
| 8,572,411 B2* | 10/2013 | Ginter | G06F 21/10 345/59 |
| 2001/0003828 A1 | 6/2001 | Peterson et al. | |
| 2002/0019941 A1* | 2/2002 | Chan | G06F 21/53 713/185 |
| 2002/0103822 A1* | 8/2002 | Miller | 707/501.1 |
| 2002/0184624 A1 | 12/2002 | Spencer | |
| 2004/0015504 A1* | 1/2004 | Ahad et al. | 707/100 |
| 2004/0034853 A1* | 2/2004 | Gibbons et al. | 717/174 |
| 2005/0105608 A1 | 5/2005 | Coleman | |
| 2005/0149726 A1* | 7/2005 | Joshi | G06F 21/51 713/164 |
| 2005/0188051 A1* | 8/2005 | Sneh | 709/213 |
| 2005/0240558 A1* | 10/2005 | Gil et al. | 707/1 |
| 2006/0005189 A1* | 1/2006 | Vega et al. | 718/1 |
| 2006/0005254 A1* | 1/2006 | Ross | H04L 63/08 726/27 |
| 2006/0031264 A1 | 2/2006 | Bosworth et al. | |
| 2006/0089995 A1* | 4/2006 | Kerr et al. | 709/227 |
| 2006/0155776 A1 | 7/2006 | Aust | |
| 2006/0190591 A1* | 8/2006 | Bobde | G06Q 10/107 709/224 |
| 2007/0033155 A1* | 2/2007 | Landsman | 707/1 |
| 2007/0033569 A1* | 2/2007 | Davidson et al. | 717/103 |
| 2007/0033588 A1* | 2/2007 | Landsman | 717/178 |
| 2007/0078950 A1 | 4/2007 | Hopkins et al. | |
| 2007/0180125 A1 | 8/2007 | Knowles et al. | |
| 2007/0188594 A1 | 8/2007 | Yoshino | |
| 2008/0072053 A1 | 3/2008 | Halim | |
| 2008/0098093 A1 | 4/2008 | Simon et al. | |
| 2008/0104195 A1 | 5/2008 | Hawkins et al. | |
| 2008/0147671 A1* | 6/2008 | Simon et al. | 707/10 |
| 2008/0148298 A1* | 6/2008 | Chatterjee et al. | 719/328 |
| 2008/0148339 A1* | 6/2008 | Hill | G06F 21/6218 726/1 |
| 2008/0189767 A1 | 8/2008 | Kothari et al. | |
| 2008/0222628 A1 | 9/2008 | Batra et al. | |
| 2008/0248834 A1* | 10/2008 | Chatterjee et al. | 455/557 |
| 2009/0055749 A1* | 2/2009 | Chatterjee et al. | 715/738 |
| 2009/0254589 A1 | 10/2009 | Nair et al. | |
| 2009/0276771 A1* | 11/2009 | Nickolov et al. | 717/177 |
| 2009/0319785 A1* | 12/2009 | Wang | G06F 21/10 713/165 |
| 2009/0328033 A1* | 12/2009 | Kohavi et al. | 718/1 |
| 2010/0042846 A1* | 2/2010 | Trotter | G06F 21/31 713/182 |
| 2010/0125477 A1* | 5/2010 | Mousseau et al. | 705/7 |
| 2010/0281102 A1* | 11/2010 | Chinta et al. | 709/203 |
| 2011/0173679 A1* | 7/2011 | Perumal | G06F 21/6218 726/4 |

OTHER PUBLICATIONS

Van et al., Autonomic virtual resource management for service hosting platforms, May 2009, 8 pages.*

B. Kim, Stability of a retrial queueing network with different classes of customers and restricted resource pooling, Jul. 2010, 7 pages.*

U.S. Appl. No. 12/402,351, filed Mar. 11, 2009, Shukla et al, Entire Document.

U.S. Appl. No. 12/402,366, filed Mar. 11, 2009, Shukla et al, Entire Document.

"Authentication in Client Applications", 2009 Microsoft Corporation, p. 1, http://msdn.microsoft.com/en-us/library/dd199485.aspx.

Bohon, Cory, "Live Mesh now available for Mac OS X", Nov. 26, 2008, pp. 1-17, http://www.tuaw.com/2008/11/26/live-mesh-now-available-for-mac-os-x/.

Borck, James, "Product Review: Adobe Breathes Fresh AIR into RIA", Apr. 21, 2008, pp. 1-4, http://www.infoworld.com/article/08/04/21/17TC-adobe-air_1.html.

Fernandes, Dan, "Ori Amiga: Programming the Mesh", Apr. 24, 2008, pp. 1-3, http://channel9.msdn.com/posts/Dan/Ori-Amiga-Programming-the-Mesh/.

"HTML5 Offline Cache", Jan. 16, 2009, pp. 1-19, http://www.whatwg.org/specs/web-apps/current-work/multipage/offline.html.

"IE8 Offline Storage", 2009 Microsoft Corporation, pp. 1-5, http://msdn.microsoft.com/en-us/library/cc197062(VS.85).aspx.

"Introducing Microsoft Sync Framework: Sync Services for File Systems", 2009 Microsoft Corporation, pp. 1-9, http://msdn.microsoft.com/en-us/sync/bb887623.aspx.

Kesteren, et al., "HTML5 Offline Apps", May 2008, pp. 1-4, http://www.w3.org/TR/offline-webapps/.

Mikhalenko, Peter, "Introducing JavaFX: Sun's New Family of Java-based Products", Feb. 26, 2008, pp. 1-7, http://www.builderau.com.au/program/java/soa/Introducing-JavaFX-Sun-s-new-family-of-java-based-products/0,339024620,339286272,00.htm?feed=pt_air.

".NET 4.0: Enabling WCF Service for Discovery", studeni 2008—Posts—DamirDobric, pp. 1-11, http://live.mscommunity.net/blogs/damirdobric/archive/2008/11.aspx.

O'Hear, Steve, "Microsofts Mesh Wants to be your Digital-Hub" Apr. 23, 2008, pp. 1-6, http://www.last100.com/2008/04/23/microsofts-mesh-wants-to-be-your-digital-hub/.

Russer, Michael, "How to Turn Your Web Browser into a Powerful Offline Sales Presentation Tool", Jan. 16, 2009, pp. 1-3, http://realtytimes.com/rtpages/20020418_offlineprez.htm.

Thorpe, Danny, "Client-Side Live Operating Environment: What's it for?", Nov. 18, 2008, pp. 1-8, http://dannythorpe.com/2008/11/18/client-side-live-operating-environment-whats-it-for/.

"IBM Lotus Expeditor 6.1 Programming Model Overview" 2006, pp. 1-12, http://publib.boulder.ibm.com/infocenter/ieduasst/lotv1r0/topic/com.ibm.iea.expeditor_v6/expeditor/6.1/ProgrammingModel/xpdv6.1_programming_model.pdf.

Introducing Microsoft Sync Framework: Sync Services for File Systems, Microsoft Corporation, Nov. 2007, pp. 1-5, http://msdn.microsoft.com/en-us/sync/bb887623.aspx.

"Web Application Manager", Distributed Systems Solutions, Inc., 1997-2000, pp. 1-11, http://www.dssolutions.com/documents/wam_whitepaper.pdf "HTML5 Offline Apps", 2008, pp. 1-4, http://www.w3.org/TR/offline-webapps/.

"HTML5 Offline Cache", Jan. 24, 2009, pp. 1-19, http://www.whatwg.org/specs/web-apps/current-work/multipage/offline.html.

Notice of Allowance cited in related Chinese application No. 201080011292.9 (PCT/US2010024669) Dated: Jul. 2, 2013 pp. 3.

Second Office Action cited in related Chinese application No. 201080011292.9 (PCT/US2010024669) Dated: Apr. 2, 2013 pp. 2.

Response to Second Office Action cited in related Chinese application No. 201080011292.9 (PCT/US2010024669) Dated: Jun. 17, 2013 pp. 4.

Non Final Office Action cited in related U.S. Appl. No. 12/402,366 Dated: Sep. 30, 2013 pp. 44.

Reply first Chinese Office Action cited in Chinese Application No. 201080011292.9 dated Mar. 15, 2013, 4 pgs.

Chinese Search Report cited in Chinese Application No. 201080011292.9 dated Apr. 23, 2013, 2 pgs.

"Introduction to DOM Storage", IE8 Offline Storage, 2009, reprinted from the Internet at: http://msdn.microsoft.com/en-us/library/cc197062%28VS.85,printer%29.aspx. 5 pgs.

(56) References Cited

OTHER PUBLICATIONS

Non-Final Office Action cited in U.S. Appl. No. 12/402,351 dated Apr. 18, 2012, 18 pgs.
Reply Non-Final Office Action cited in U.S. Appl. No. 12/402,351 dated Jul. 18, 2012, 24 pgs.
Notice of Allowance cited in U.S. Appl. No. 12/402,351 dated Aug. 2, 2012, 11 pgs.
Notice of Allowance cited in U.S. Appl. No. 12/402,351 dated Dec. 5, 2012, 11 pgs.
Non-Final Office Action cited in U.S. Appl. No. 12/402,366 dated Jul. 8, 2011, 27 pgs.
Reply Non-Final Office Action cited in U.S. Appl. No. 12/402,366 dated Oct. 11, 2011, 17 pgs.
Final Office Action cited in U.S. Appl. No. 12/402,366 dated Feb. 3, 2012, 25 pgs.
Reply Final Office Action cited in U.S. Appl. No. 12/402,366 dated Mar. 30, 2012, 21 pgs.
Int. Search Report cited in PCT Application No. PCT/US2010/024669 dated Sep. 29, 2010, 3 pgs.
Int. Preliminary Report cited in PCT Application No. PCT/US2010/024669 dated Sep. 13, 2011, 5 pgs.
Chinese Office Action cited in Chinese Application No. 201080010292.9 dated Nov. 5, 2012, 4 pgs, Visible Sections only.
"View and save videos stored in browser cache", TheFreeWindows, Jul. 2008, reprinted from the Internet at: http://www.thefreewindows.com/334/view-and-save-videos-stored-in-browser-cache/, 2 pgs.
"How to access the sharing data offline?", Nov. 27, 2007, Computer Tips, reprinted from the Internet at: http://www.computerfreetips.com/networking_tips/access_sharing_data_offline.html 6 pgs.
"How They Work: Three Approaches to Authorization Management", May 17, 2005, reprinted from the Internet at: http://www.computerworld.com/computerworld/records/images/pdf/37techtools.pdf, 1 pg.
Reply Non-Final Office Action cited in U.S. Appl. No. 12/402,366 dated Dec. 30, 2013, 14 pgs.
Notice of Allowance cited in U.S. Appl. No. 12/402,366 dated Apr. 10, 2014. 14 pgs.
Notice of Allowance cited in U.S. Appl. No. 12/402,366 dated Jun. 19, 2014. 8 pgs.
Non-Final Office Action cited in U.S. Appl. No. 14/462,325 dated May 11, 2015, 13 pgs.
Reply Non-Final Office Action cited in U.S. Appl. No. 14/462,325 dated Aug. 24, 2015, 14 pgs.
Final Office Action cited in U.S. Appl. No. 14/462,325 dated Dec. 3, 2015, 20 pgs.
Reply Final Office Action cited in U.S. Appl. No. 14/462,325 dated May 3, 2016, 19 pgs.
Korean Office Action cited in Korean Application No. 10-2011-7020852 dated Nov. 13, 2015, 2 pgs.
Reply Korean Office Action cited in Korean Application No. 10-2011-7020852 dated Jan. 12, 2016, 1 pg.
Korean Notice of Allowance cited in Korean Application No. 10-2011-7020852 dated May 10, 2015, 5 pgs.
"Introduction to DOM Storage", 2009, reprinted from the Internet at: http://msdn.microsoft.com/en-us/library/cc197062%38VS_85.printer%29.aspx, 5 pgs.
"Offline Web Applications—W3C Working Group Note", Anne Van Kesteren and Ian Hickson, May 30, 2008, reprinted from the Internet at: Http://www.w3.org/TR/offline-webapps, 4 pgs.

* cited by examiner

PROGRAMMING MODEL FOR INSTALLING AND DISTRIBUTING OCCASIONALLY CONNECTED APPLICATIONS

BACKGROUND

In the field of computing, many types of applications executing on a computer system may be developed that interact with an application host that provides some functionality for the application. For example, an application host may provide the application to the computer system over a network for local execution; the application host may handle a portion of the processing of the application, or may even execute the logic of the application on behalf of the application while the computer system provides an interface to the remotely executing application; and/or the application host may store some data objects that are used by the application, such as media files rendered by a media viewer application or a database exposed to a user through a data-driven application. The application host often communicates with the computer system over a network, and the application may initiate by first contacting the application host.

In some such scenarios, the application is executed on the computer system within a virtual environment, such as a web browser. The virtual environment may provide many advantages as compared with native execution of the application. As a first example, an application may not be fully trusted, such as an application received from an untrusted party that may endeavor to perform incorrect or malicious operations on the computer system. The virtual environment may facilitate the execution of such applications by isolating the application from accessing the computing environment (comprising aspects of the computer system such as the file system, the set of user accounts, other processes and applications that may be concurrently executing, and segments of memory that do not belong to the application), thereby limiting the potential damage that might be caused by the untrusted application. Conversely, the virtual environment may isolate the application from interference by other applications, and may therefore safeguard the application resources utilized by the application. As a second example, an application may perform operations that are differently achieved on different computer systems, and the virtual environment may provide an interface for the application that accepts requests in a less system-dependent manner and adapts such operations to the particular computer system. For example, a web browser may allow applications written in a popular but system-independent computer language, such as JavaScript, to execute appropriately on a computer system in view of its particular capabilities. As a third example, a virtual environment may combine the application with other data objects; e.g., a web browser may present an application to a user not as a standalone application, but embedded in other visual content comprising a website of the application host.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

While it may be advantageous to structure an application to utilize an application host, it may be undesirable to design the application to depend on the availability of an application host, which may occasionally become inaccessible; e.g., the link of the computer system to a network may be interrupted, the application host may go offline, may be taken down for maintenance or upgrading, or may terminate service. Many applications may become wholly inaccessible (such as an application hosted in a web page that is inaccessible) or may fail to operate correctly (such as a locally executed, data-driven application that cannot access the remote database.) However, the user may still wish to use the application during the period of application host inaccessibility. Even if the application cannot perform certain operations while the application host is inaccessible, the application may assist the user in portions of the operation until the application host becomes accessible. For example, an email client may be unable without recourse to send mail when an email server is unavailable, but the email client may permit the user to prepare drafts of email messages to be sent upon reconnection and/or to access email messages that have been previously delivered by the application host.

One technique for promoting the installation and management of such occasionally connected applications relates to the manner of initiating the application within the virtual environment. The application resources may be received and locally stored, and the application may be launched within the virtual environment within the context of the application host. In particular, the application resources comprising the application may be stored not in the memory of the virtual environment (such as a browser cache), but in the computing environment, such as in the file system in a similar manner with natively executing applications. However, in contrast with natively executing applications, this virtual executing application may be initiated within the virtual environment, and in the application host context (e.g., in a website provided by the application host.) This configuration may promote the association of the application with the application host. For example, a web application configured in this manner may be locally stored, but may be launched in a web browser within the context of the originating website, which may facilitate the connection of the application with the application server when connected and may reduce cross-domain errors, yet may still permit the application to execute when the application server is unreachable. Additionally, by storing the application resources in the computing environment, a set of services may be applied to the web application, such as automated deployment, versioning, and synchronizing across the set of computers and devices comprising the user's computing environment. Moreover, such services may be applied independently of the virtual environment (e.g., when the application is not running, and even when the virtual environment does not exist on the computer system.)

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
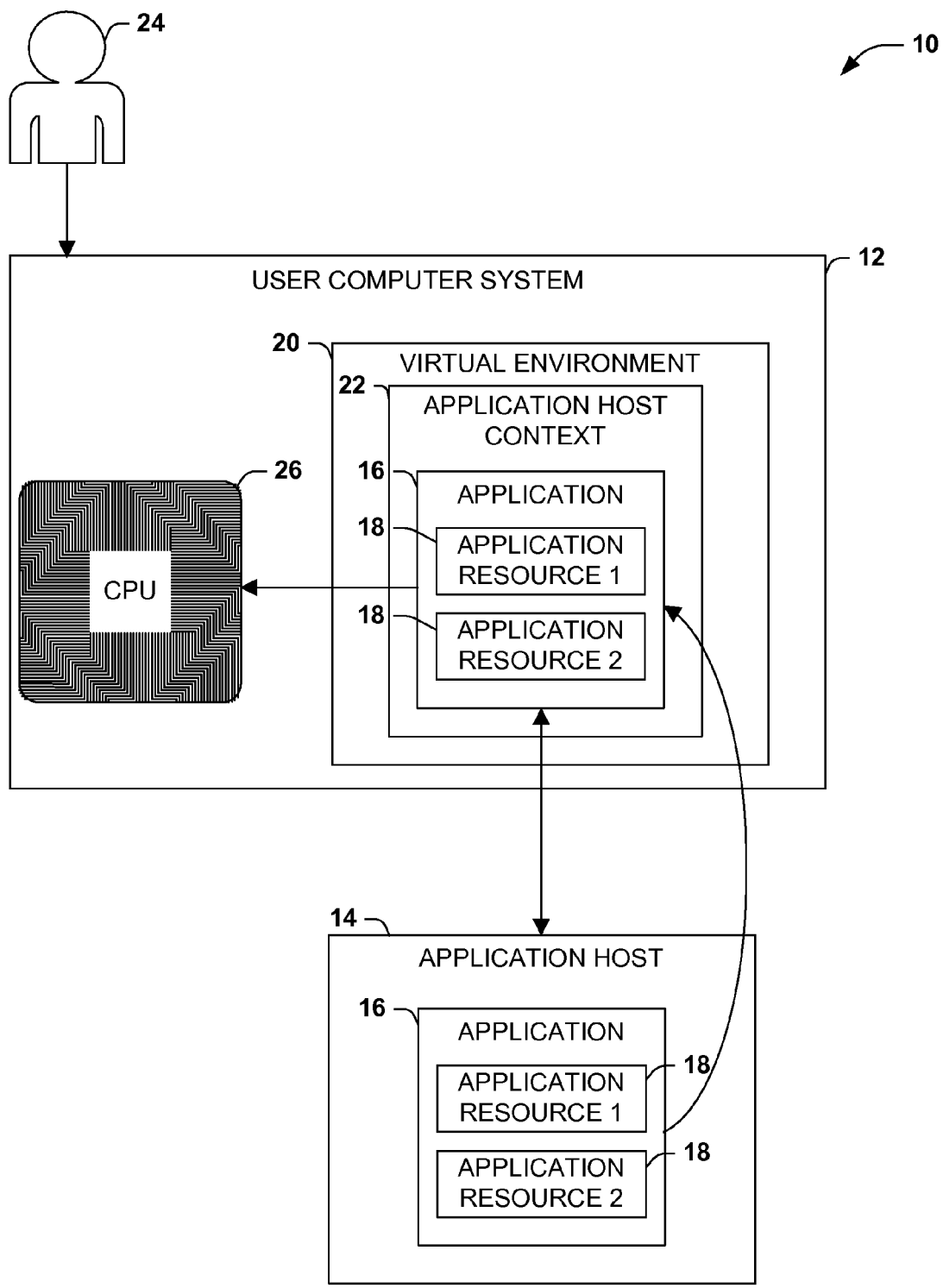
FIG. 1 is a component block diagram illustrating an exemplary scenario of an application executing in a virtual environment and serviced by an application host.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

In the field of computing, an application may be hosted on a computer system in many ways. A native application may be executed within the operating system, such as a console-based application that communicates with users in a terminal window or a graphical user interface that communicates with users in a window managed by a graphical operating system. An application may also execute within a virtual environment, such as a virtual machine that emulates a particular environment that differs from the native computing environment and executes the application within this virtual environment. Virtual execution may be helpful, e.g., for providing a standardized environment that may be utilized by applications regardless of the details and capabilities of the native computing environment. For example, a Java application may execute in any computing environment that features a Java virtual machine; the operations of the Java application are specified against the Java virtual environment, and are translated by the Java virtual machine into operations that are compatible with the actual machine on which the application is executing. Virtual execution may also be useful for promoting the security of the application, such as by isolating the application and the virtual environment of the application from the native computing environment. For example, an application that is partially or wholly untrusted might contain logical errors or malicious instructions that might be harmful to the computing environment, and it may be preferable to execute this application in an isolated virtual environment in order to protect the native computing environment. Conversely, the application may be protected from interference by other applications if its execution is isolated in the virtual environment.

Contemporary applications are often provided by an application host, which provides various services to the computer. As a first example, an application host may store a set of application resources that together comprise the application, such as executable binaries, media objects used by the application, and documentation, and the application host may deploy such resources to the computer upon receiving a request to install or execute the application. As a second example, an application host may provide access to one or more application resources during the execution of the application; e.g., a data-driven application may be configured to interface with a database that is retained by the application host (or another computer system) that provides live data to the application, and may also store or alter data generated by the application. As a third example, an application host may handle some of the processing on behalf of the application during execution by the computer. For example, in a thin-client application architecture, the application executing on the computer may be configured to receive input, send the input to the application host, receive output from the application host, and render the output for the user; the application host may be configured to perform the logic of the application, and to store and manage various data objects used by the application.

One scenario that illustrates both of these aspects is a web application. A contemporary web browser may be configured to execute web applications featured in a website provided by a webserver. The resources comprising the web application are provided by the webserver to the web browser, which forms a virtual environment and executes the application therewithin. Moreover, the application may be executed in the context of the application host. For example, web browsers often limit the network connections that a web application is allowed to initiate or accept to connections with the domain of the hosting website. This domain forms the context of the web application, and the restriction of the web application to communicating with the domain provides an isolation mechanism that promotes the security of the computing environment and the web application. The web application may also be presented in the visual context of the source webserver, such as embedded within the website presented by the webserver alongside other visual indicators, interactive elements, and additional web applications comprising the website.

More generally, FIG. 1 illustrates an exemplary scenario 10 featuring a computer 12 and an application host 12 that cooperate in order to execute an application 16, comprising a set of application resources 18 including a first application resource and a second application resource (e.g., an executable binary and a small database used by the executable binary.) The computer 12 may receive a request, such as from a user 24, to execute the application 16 hosted by the application host 14. The computer 12 may in turn request the application host 14 to deliver the application 16, and the application host 14 may respond by delivering the application resources 18 to the computer 12. The computer 12 may then execute the application 16 within a virtual environment 20 by forming an application host context 22 for the application host 14, which may serve as an isolation boundary within the virtual environment 20 for the set of applications associated with the application host 14; e.g., applications within the application host context 22 may be permitted to communicate with the application host 14 and with each other, but may not be permitted to communicate with other application hosts or applications outside the application host context 22. When the first application resources 18 are received, the computer 12 may then execute the application 16 in the application host context 22, e.g., by executing the instructions of an executable binary on a processor 26. Because the application 16 executes within the virtual environment 20, some operations may have to be translated for execution on the particular computer 12 and processor 26 provided therein (e.g., the virtual environment 20 may be configured to emulate a Java virtual machine, and if the application 16 is a Java application, the virtual environment 20 may have to translate operations by the application 16 against the emulated machine into operations against the processor 26 and computer 12.) Nevertheless, the execution of the application 16 within the virtual environment 20 of the computer 12 is thereby achieved. Additionally, the application 16 may be presented alongside other elements provided by the application host 14, such as visual content presented in a comprehensive interface defined by the application host 14. The application 16 is also permitted to communicate with other applications hosted in the same comprehensive interface that are executing in the same application host context 22.

However, an application host coupled with an application may become unavailable for many reasons, such as a network disconnection or transition of the user's computer, a network disconnection of the application host, a disablement of the application hosting service on the application host, or a network partitioning that prevents the computer from reaching the application host. Therefore, while the association of an application with an application host may present certain advantages, the association might create a dependency, such that if the application host becomes unreachable, the application may become unavailable or may not operate in a proper manner. For example, in the first few generations of web applications, the application resources were delivered by a webserver to a web browser for use during the current browser session, and were often discarded when the browser was closed, or even when a user navigated away from the website hosting the web application. In order to initiate the web application at a later time, the web browser had to download the application resources again, and if the webserver were unreachable, the application was also unavailable. More generally, in FIG. 1, the virtual environment 20 may maintain the application host context 22 on an ad hoc basis, and may store the applications resource 18 of the application 16 only during the lifetime of the application 16. Once the application 16 is terminated, the virtual environment 20 may discard the application 16, and may further discard the application host context 22 if no other sessions with the application host 14 are active. When the user 24 issues a second request at a later time to execute the application 16, the computer 12 may have to retrieve the application resources again, and the virtual environment 20 may have to recreate the application host context 22 for the application host 14. In addition to expending additional computing resources in the second retrieval of the application resources, this scenario may be problematic if the application host 14 is unavailable at the time of the second request to execute the application 16, and the computer 12 may therefore be unable to execute the application 16.

Figure 2:
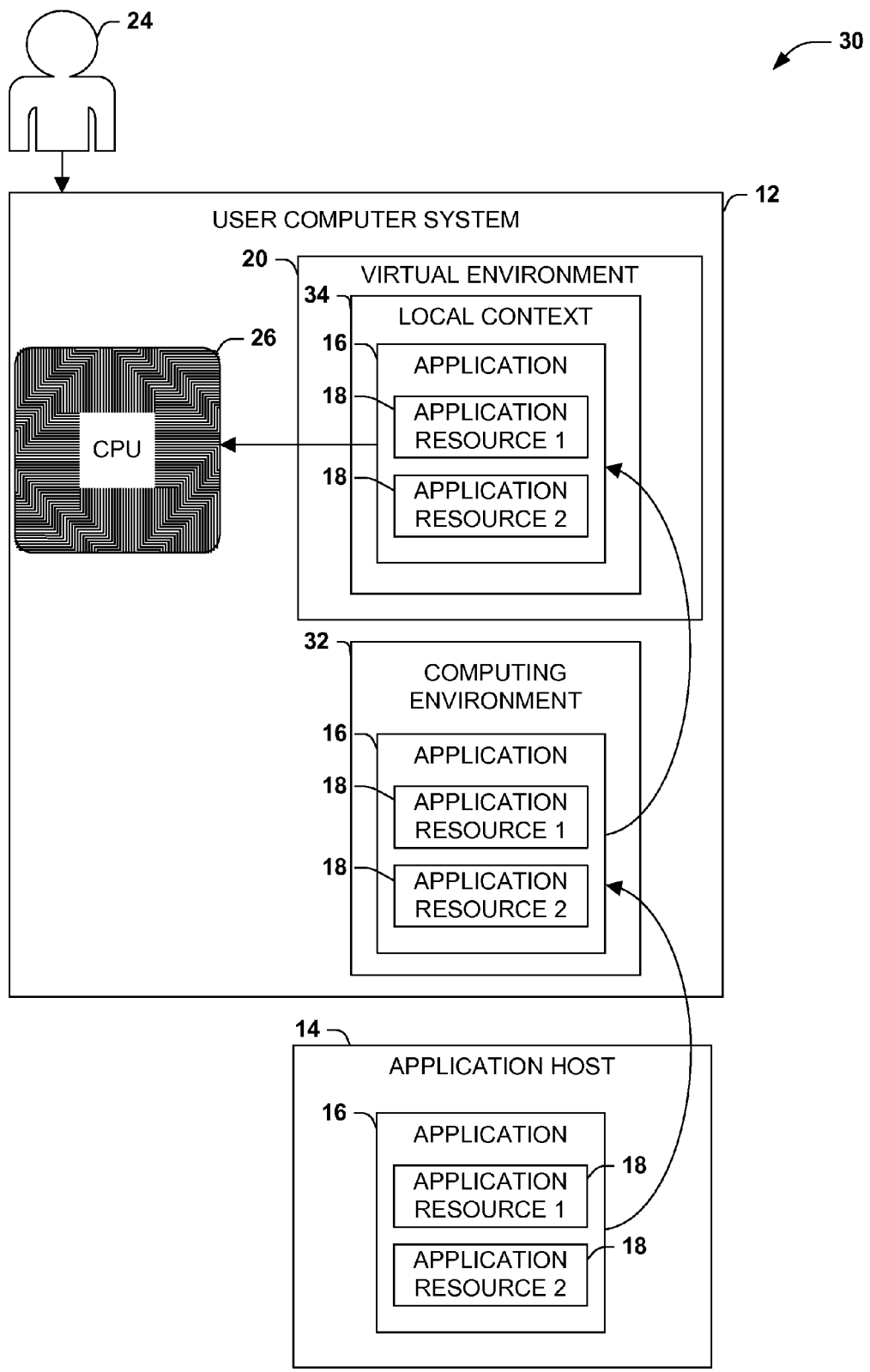
FIG. 2 is a component block diagram illustrating another exemplary scenario of an application executing in a virtual environment and serviced by an application host.

FIG. 2 illustrates another exemplary scenario 30, again featuring a computer 12 cooperating with an application host 14 to achieve the execution of an application 16 within a virtual environment 20. The computer 12 again requests the application 16 from the application host 14 on behalf of a user 24, which delivers to the computer 12 a set of application resources 18. However, the computer 12 in FIG. 2 also features a computing environment 32, comprising the set of objects that form the user's computing experience, such as installed applications; information about the configuration of respective application and the operating system; user data files created and maintained by the user; user accounts and profiles available on the computer 12; security credentials utilized by various users, such as passwords, access control lists, and authentication certificates; and representations of various computers and devices comprising the computing environment of the user 24. These data objects may be stored in many places on the computer 12, such as user data files in a file system, entries in a system registry, and a set of user accounts and permissions stored in the operating system; however, the data objects together comprise the computing environment 32. By contrast, the computing environment 32 might not include the current, ad hoc data objects used by the computer 12 to present the computing environment to the user 24, such as executing instances of such applications and unsaved documents that are temporarily loaded into memory. Similarly, the computer 12 in FIG. 1 is not illustrated with a computing environment 32, either because the computing environment 32 is not involved in the execution of the application 16 in the exemplary scenario 10 of FIG. 1. Indeed, the computing environment 32 might not even exist on the computer 12 of FIG. 1, such as a public terminal operated by the user 24 to access the application host 14 in a temporary manner.)

Referring again to the exemplary scenario 30 of FIG. 2, when the user 24 requests to access the application 16 hosted by the application host 14, the computer 12 may send a request to the application host 14 for the application 16, which may respond by delivering the application resources 18. However, upon receiving these application resources, the computer 12 in this exemplary scenario 30 stores them in the computing environment 32, e.g., as files stored in the file system, or as assemblies stored in an assembly cache. The application 16 may then be initiated by executing the locally stored application resources of the application 16 (e.g., an executable binary may be initiated as a local application within the virtual environment 20.) In contrast with FIG. 1, this exemplary scenario 30 may be advantageous because the storage of the application resources of the application 16 is less volatile, and is designed to remain as part of the computing environment 32 irrespective of the existence of an application host context or an executing instance of the application 16. In this manner, the application 16 is installed in the computer 12 and initiated in a manner similar to native applications.

However, the exemplary scenario 30 of FIG. 2 presents some disadvantages relating to the context within which the application 16 initiated. Because the application resources comprising the application 16 are locally stored, the virtual environment 20 initiates the application 16 in a local context 34, i.e., in an isolation boundary that prevents the application 16 from contacting any application host, including the application host 14 that delivered the application 16 to the computer 12. Consequently, because the application 16 may be unable to contact the application host 14, the application 16 may be unable to use the resources and services provided by the application host 14. Moreover, the application 16 can no longer be presented in a visual interface provided by the application host 14, and may no longer communicate with other applications provided by the application host 14 that are not executing in the same context as the local context 34 generated for the application 16. Thus, in this exemplary scenario 30, the advantage of persistence is obtained at the expense of the capability to interact with the application host 14. While this disadvantage may be ameliorated by relaxing the isolation policies of the virtual environment 20, the exceptions to the isolation policies may jeopardize the integrity of the virtual environment 20 (e.g., the application 16 may now be permitted to contact any application host 14.)

Figure 3:
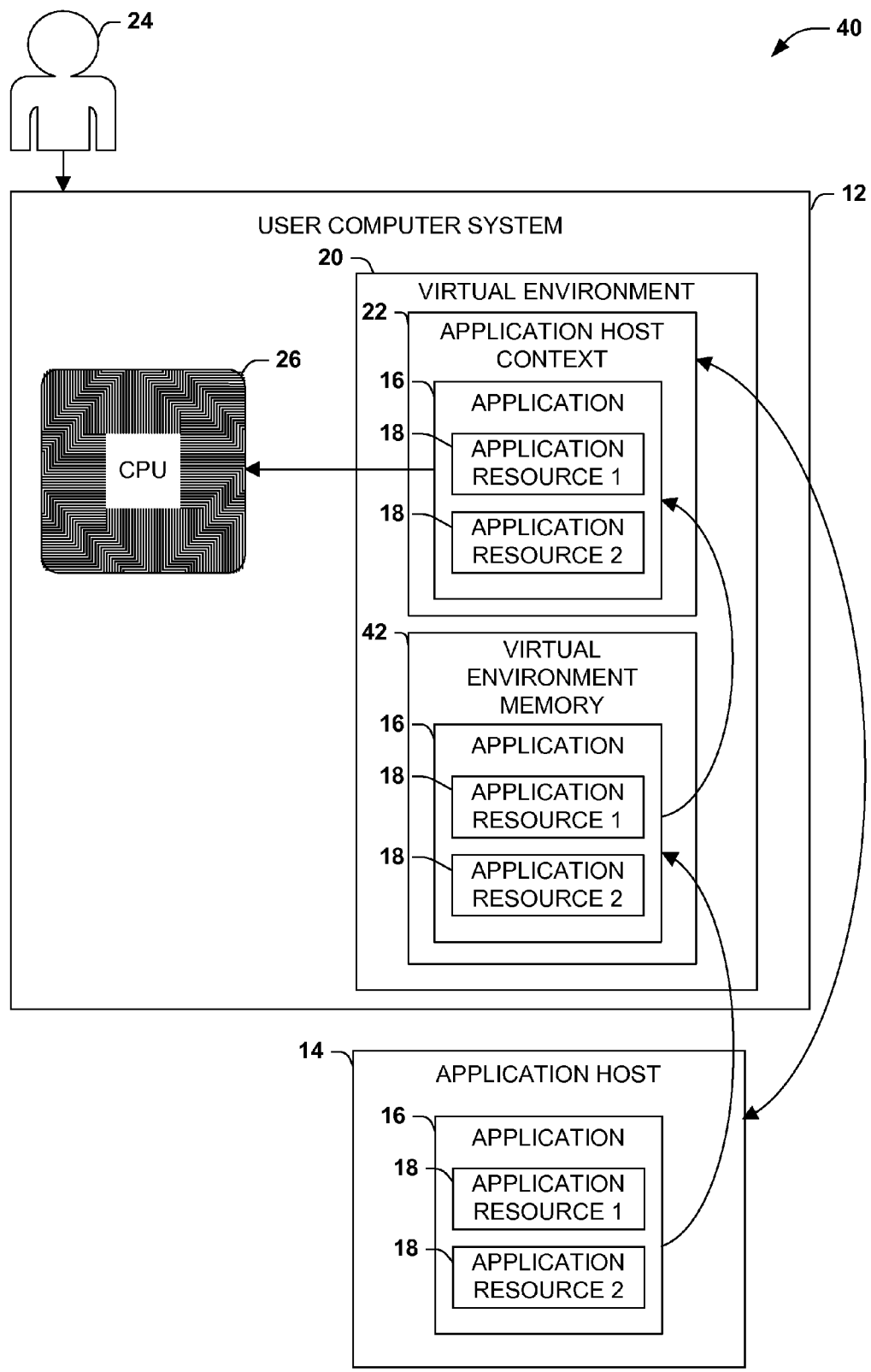
FIG. 3 is a component block diagram illustrating yet another exemplary scenario of an application executing in a virtual environment and serviced by an application host.

FIG. 3 presents another exemplary scenario 40, again featuring a computer 12 and an application host 14 that interact to install and initiate an application 16 within a virtual environment 20. The application 16 again comprises a set of application resources 18, and upon receiving a request (e.g., from a user 24) to initiate the application, the computer 12 may send a request to the application host 14, which may deliver the application resources comprising the application 16. However, in this exemplary scenario 40, the application resources may be stored in a virtual environment memory 42 within the virtual environment 20, such as a web cache associated with a web browser. The virtual environment memory 42 may be configured as a more static object store than the working-set memory of the operating instance of the virtual environment 20 (e.g., a web cache may comprise a set of data objects stored in a local file system, and may persist when the web browser is closed or when the computer 12 is rebooted.) In contrast with FIG. 1, the virtual environment memory 42 may therefore facilitate the persistence of the application 16 beyond the first instance of execution. Additionally, the virtual environment 20 may also store in the virtual environment memory 42 a reference to the application host 14 that provided the application 16, and upon initiating the application 16, the virtual environment may initiate the application 16 in the application host context 22, enabling the application 16 to communicate with the application host 14 according to the isolation policies of the virtual environment 20. The application 16 may also execute alongside other objects as a comprehensive interface provided by the application 14, and may communicate with other applications executing alongside the application 16 in the application host context 22. In this manner, the storage of the application resources of the application 16 in the virtual environment memory 42 of the virtual environment 20 preserves the capability of the application 16 to interact with the application host 14, and also promotes the persistence of the application 16 after the application 16 is terminated, the application host context 22 is discarded and even if the current instance of the virtual environment 20 is discarded, such as during a reboot of the computer 12.

However, the configuration presented in the exemplary scenario 40 of FIG. 3 may present some disadvantages arising from the storing of the application 16 in the virtual environment memory 42. Computers and operating systems often provide a wide range of services relating to the set of installed applications, such as installing applications according to particular interests of a user 24; interfacing the application with the operating environment (e.g., registering associations between the application and particular object types, and registering frequently used assemblies in an assembly cache); receiving and applying updates to an application received from an application host or from a local network application server; synchronizing the deployment of applications across a wide variety of computers and devices included in the computing environment; facilitating the activation and auditing of applications according to licensing policies; and facilitating a user in relocating, repairing, and uninstalling applications. However, in order to provide such services, the operating system recognizes the set of applications and the details thereof; e.g., applications may be identified to the operating system during installation and stored in a portion of the file system that is reserved for applications. By contrast, in the exemplary scenario 40 of FIG. 3, the application 16 is stored in an isolated and atypical location in the virtual environment memory 42, and it may be difficult to apply such services to the application 16. As a first example, an application updating service may update the version of a typical application by replacing or altering compiled binaries and resources in the file system, but the virtual environment 20 may not permit or facilitate such access to data objects stored in the virtual environment memory 42. In fact, the virtual environment 20 might preclude or complicate such access in the interest of security; e.g., an application resource may be renamed or hidden in order to promote the isolation of the application according to the isolation policies of the virtual environment 20. Alternatively, if the virtual environment memory 42 is designed primarily for promoting the storing and accessing of resources by the virtual environment 20, then it may store all data objects together in a comparatively disorganized heap. For example, some web browsers store items in a browser cache with arbitrarily chosen names that are mapped to URLs through an internal lookup table, in order to promote security (since it is more difficult to locate a particular item) and economy of computing resources (since many resources share a similar name, e.g., "index.html", a standardized renaming prevents the storing of multiple items with the same name.)

Another disadvantage of the exemplary scenario 40 of FIG. 3 is that if the application 16 is stored in the virtual environment memory 42, some aspects of the isolation policies of the virtual environment 20 may continue to apply. For example, because the application 16 executes in the application host context 22, the virtual environment 20 may isolate the application 16 to accessing the application resources with which it is associated and that are stored in the virtual environment memory 42, and may preclude access to the computing environment (e.g., to files stored in the file system.) Even if such access is permitted, it may be difficult to implement other associations of the application with the computer 12, such as associations with particular types of data object according to which the operating system may invoke a suitable application 16 to handle a data object of a particular type (e.g., applications that are capable of rendering and presenting a particular type of media object.) It may be difficult to achieve this configuration because the operating system may have difficulty invoking the application 16 to handle a particular data object. These and other complications arise, at least in part, from the storing of the application resources comprising the application 16 in the virtual environment memory 42, which separates such applications from the other applications installed on the computer 12, and inherently applies a different model by which such applications are represented and managed than for applications installed in a more conventional manner.

It may be appreciated that the exemplary scenarios illustrated in FIGS. 1 through 3, and the difficulties ensuing from each configuration of the application within the virtual environment, arise from potential conflicts between the nature of a locally installed application and the nature of an application managed by an application host. These complications may become particularly visible for applications that are occasionally connected to the application host, but that are occasionally disconnected from the application host. As one example, an email host may be devised that not only provides conventional email services, such as storing, delivering, and sending mail, but that provides the email client application to the computer. It may be desirable to configure the email client application to execute even when the email host is unavailable, e.g., to allow the user to draft email messages and to review previously received email messages. If implemented within the virtual environment 20 according to the exemplary scenario 10 of FIG. 1, the email client application may be completely unavailable when the email host is available, because the virtual environment 20 may be unable to obtain the application resources from the application host. If implemented according to the exemplary scenario 30 of FIG. 2, the email client application may be accessible when the email host is unreachable, but may be unable to contact the email host when it is otherwise reachable because of the isolation policies of the virtual environment 20. If implemented according to the exemplary scenario 40 of FIG. 3, the email client accessible may be accessible when the email host is available or unavailable, but may be restricted to storing messages and application resources within the virtual environment memory 42. Such email messages are therefore isolated from the computing environment, and such application resources may be difficult to access outside of the virtual environment 20, e.g., in order to update the email client application with a later version of a particular application resource.

In view of these considerations, a different technique may be developed for the installation and initiating of an application within a virtual environment. According to this technique, the application may be installed and managed in a similar manner to other applications—i.e., in the computing environment of the computer—but may be initiated and executed in the application host context of the application host.

Figure 4:
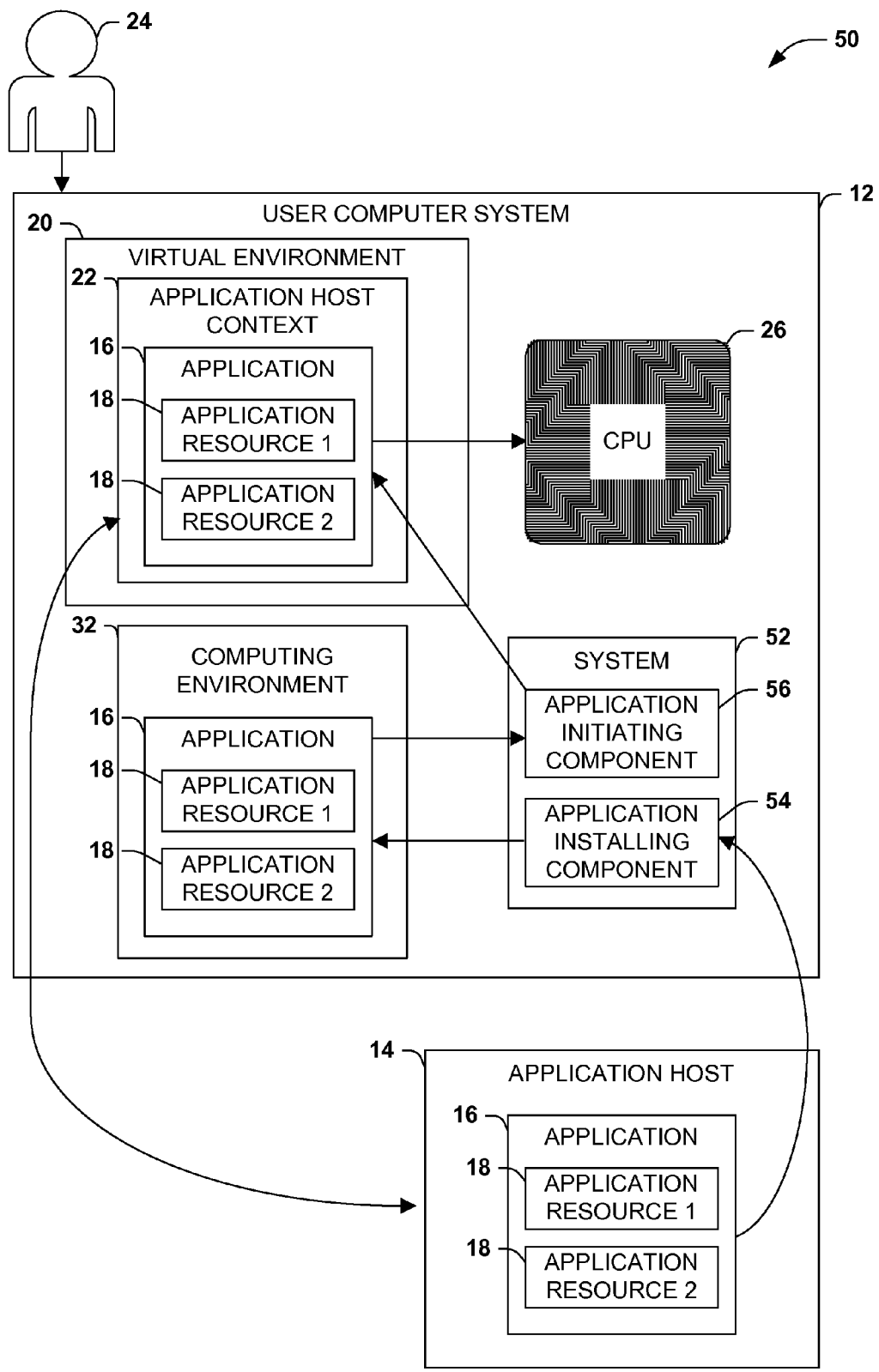
FIG. 4 is a component block diagram illustrating yet another exemplary scenario of an application executing in a virtual environment and serviced by an application host.

FIG. 4 presents an exemplary scenario 50 implementing this technique in a computer 12 operated by a user 24, again featuring an application 16, comprising a set of application resources 18 provided by an application host 14 and executed within a virtual environment 20. However, in this configuration, the computer 12 includes an exemplary system 52 configured to manage an installation of the application 16. The system 52 comprises an application installing component 54 that receives the application resources from the application host 14 and stores the application resources in the computing environment 32. The application 16 is thereby included in the computing environment 32, and may be accordingly recognized and serviced by the operating system of the computer 12. However, the system 52 also comprises an application initiating component 56 that, upon receiving a request to initiate the application 16, retrieves the application resources 18 from the computing environment 32 and initiates the application 16 within the virtual environment 20 in the application host context 22 of the application host 14. By so executing the application 16, the system 52 promotes the communication of the application 16 with the application host 14 in accordance with the isolation policies of the virtual environment 20; yet, by storing the application resources 18 in the computing environment 32, the system 52 also permits the application 16 to execute within the virtual environment 20 when the application host 14 is unreachable.

Figure 5:
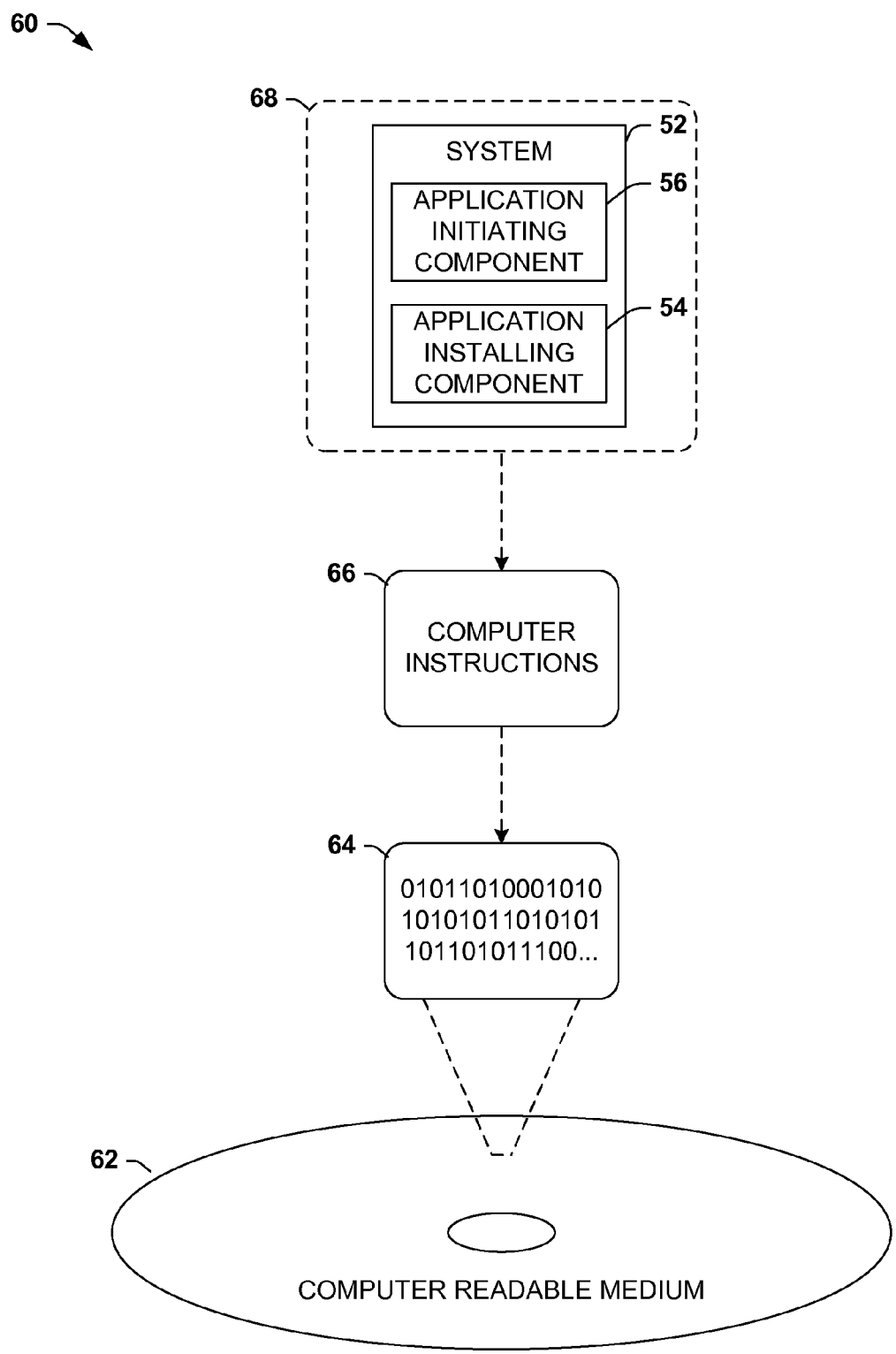
FIG. 5 is an illustration of an exemplary computer-readable medium comprising processor-executable instructions configured to embody one or more of the provisions set forth herein.

Another embodiment involves a computer-readable medium comprising processor-executable instructions configured to apply the techniques presented herein. An exemplary computer-readable medium that may be devised in these ways is illustrated in FIG. 5, wherein the implementation 60 comprises a computer-readable medium 62 (e.g., a CD-R, DVD-R, or a platter of a hard disk drive), on which is encoded computer-readable data 64. This computer-readable data 64 in turn comprises a set of computer instructions 66 configured to operate according to the principles set forth herein. In one such embodiment, the processor-executable instructions 66 may be configured to implement a system for managing an installation of an application, such as the exemplary system 52 of FIG. 4. Many such computer-readable media may be devised by those of ordinary skill in the art that are configured to operate in accordance with the techniques presented herein.

A first aspect that may vary among embodiments of these techniques relates to the availability or unavailability of the application host 14. As discussed with reference to FIG. 4, one significant advantage of storing the application resources 18 of the application 16 in a computing environment 32 is the improved availability of the application 16, regardless of whether or not the application host 14 may be contacted. For some applications, particularly applications that do not significantly rely on the application host 14 for runtime service, this advantage may be fully realized simply by receiving and locally storing the application resources comprising the application, which may operate similarly without regard to the availability of the application host 14. However, other applications may exhibit greater advantage by executing the application 16 differently based on the connection state of the application host 14. In particular, an application host initiating component 56 may be configured to initiate an application 16 in an application host connection context, which may be selected form a set of application host connection context including a connected context (where the application host 14 is reachable) and a disconnected context (where the application host 14 is unreachable.) Other application host connection contexts may also be available, e.g., a bandwidth-sensitive connected context, wherein the application 16 may utilize the application host 14 but only for requests that involve limited bandwidth use, or an application-host-sensitive connected context, wherein the application 16 may utilize the application host 14 but only for requests that make limited use of the computational resources of the application host 16.

The variable configuration of the application 16 based on the connectedness of the application host 14 may be achieved in many ways. In particular, the application initiating component 56 may determine the application host connection context in many ways. In a first embodiment, the application initiating component 56 may be informed of the application host connection status, such as by the operating system (e.g., based on whether or not any network connection is available) or by another component operating in the computer 12 (e.g., a component configured to manage the connection of the computer 12 with the application host 14, such as in a heavily server/client-oriented architecture.) In a second embodiment, the application installing component 56 may more actively determine a connection status of the computer 12 with the application host 14 (e.g., by attempting to contact the application host 14), and may initiate the application in either a connected context or a disconnected context based on the detected connection status. Alternatively or additionally, the system 52 may include an application host connection context updating component, which may be configured to detect a changed connection status of an application host 14 associated with at least one executing application 16, and upon detecting a changed connection status, may accordingly update the application host connection context of the application 16 (e.g., by transitioning the application 16 from a connected context to a disconnected context.)

In addition, the configuration of the application 16 may be altered in many ways in view of the application host connection context. As a first example, an application host 14 may comprise an application resource 18 that is difficult or undesirable to deploy in a complete manner to the computer 12, such as a very large application resource or an application resource that is very often updated. While it may be desirable for an application 16 utilizing this application host 14 to rely on the live and/or complete version of the application resource 18, it may also be desirable to enable the application 16 to be reconfigured for use in a disconnected context. Accordingly, the application host 14 may offer a local application resource corresponding to a deployable version of the application resource 18 (e.g., a portion of a large database, a compressed and greatly downsampled version of a large media object, or a recent snapshot of a frequently updated application resource), which may be stored in the computing environment 32. The application 16 may then utilize either the application resource 18 or the local application resource depending on the application host connection context in which the application 16 is initiated.

Figure 6:
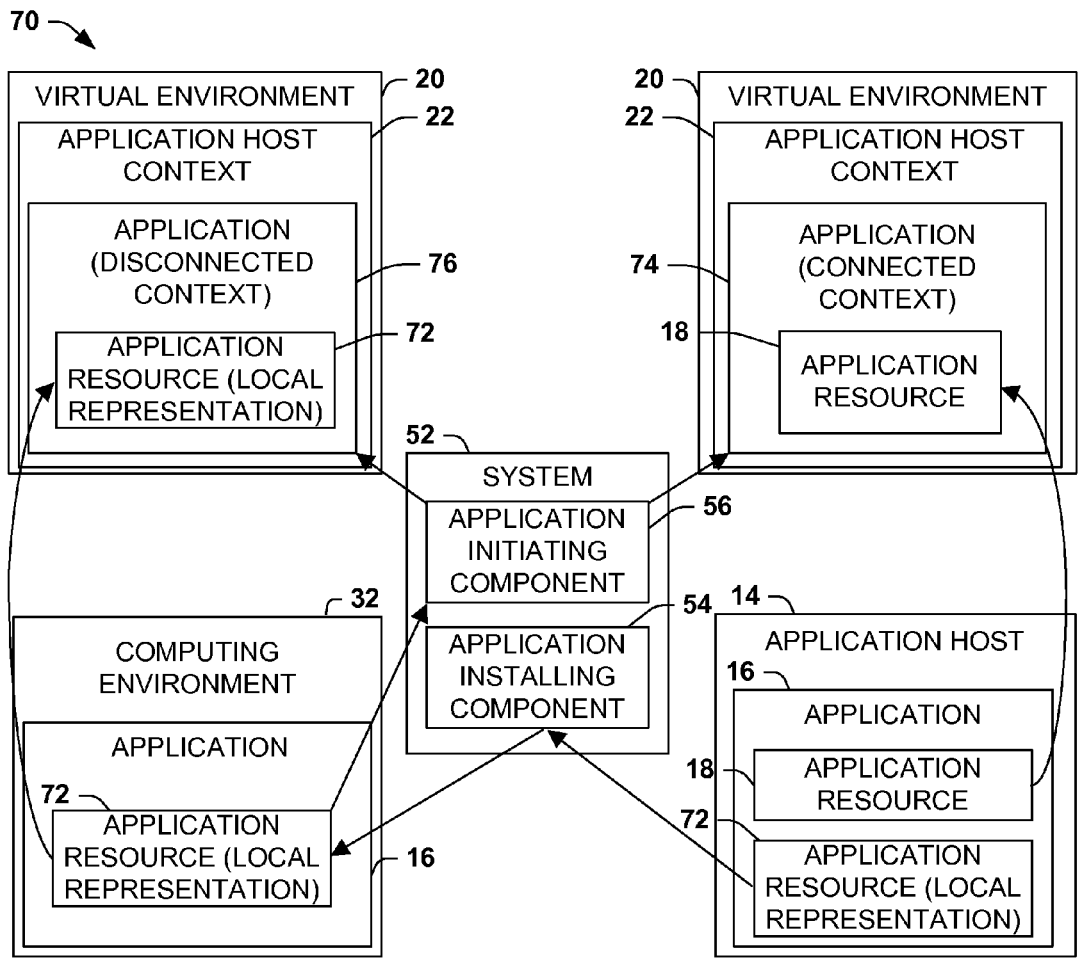
FIG. 6 is a component block diagram illustrating an initiating of an application in an application host connected context and an application host disconnected context.

FIG. 6 illustrates an exemplary scenario 70 utilizing this technique, wherein an application host 14 hosts an application 16 comprising an application resource 18 and also a local representation 72 of the application resource 18. (The local representation 72 may be separately generated and stored by the application host 14, or may be generated on an ad hoc basis, e.g., by taking a snapshot of the application resource 18 or by downsampling or compressing the application resource 18 upon request.) A system 52 may comprise an application installing component 54 that is configured to receive the local representation of the application resource 18 and to store it in the computing environment 32 as part of the application 16 (and possibly alongside other application resources, e.g., executable binaries that may utilize the application resource 18 or its local representation 72.) In addition, the application initiating component 56 may be configured to initiate the application 16 within the virtual environment 20 in the application host context 22, and also in an application host connection context. In the exemplary scenario 70 of FIG. 6, a first application instance 74 is initiated in a connected context, and the application initiating component 56 is configured to retrieve the application resource 18 from the application host 14 and initiate the first application instance 74 within the virtual environment 20 and in the application host context 22 with the application resource 18. For example, the application initiating component 56 may obtain and provide to the first application instance 74 an up-to-date version of the frequently updated application resource 18, may execute one or more database queries against a database and provide the full results of the query, or may begin streaming a high-quality version of a media object from the application host 14. By contrast, a second application instance 76 may be initiated in a disconnected context, such as when the application host 14 is unavailable. The application initiating component 56 may therefore retrieve the local representation 72 of the application resource 18 from the computing environment 32, and may initiate the second application instance 76 within the virtual environment 20 and in the application host context 22 with the local representation 72 of the application resource 18. For example, the application initiating component 56 may provide to the second application instance 76 a recent snapshot of a frequently updated resource, may render the compressed and downsampled version of the media object that is hosted in full quality on the application host 14, or may query a smaller, deployable version of the database and provide the synopsized, truncated, or partial query results. In this manner, the system 52 may facilitate the accessing of the application resource 18 by the application 16 during execution in either application host connection context.

As a second example of this first aspect, the system 52 may promote the updating of the application resources 18 of the application 16, both as represented in the computing environment 32 and in the application host 14. For example, while the application 16 is executing in a disconnected context, a user 24 may update an application resource 18 (e.g., by authoring an email message in an email client application that is to be delivered upon reconnecting to an email host), and/or the application host 14 may update an application resource 18 (e.g., by receiving mail in an email box, or by updating an executable binary to a new version with improved features.) Upon later initiating the application 16 in a connected context, the application initiating component 56 may facilitate the resolution of these changes in order to synchronize the representation of the application 16 in the computing environment 32 with the representation of the application 16 at the application host 14.

Figure 7:
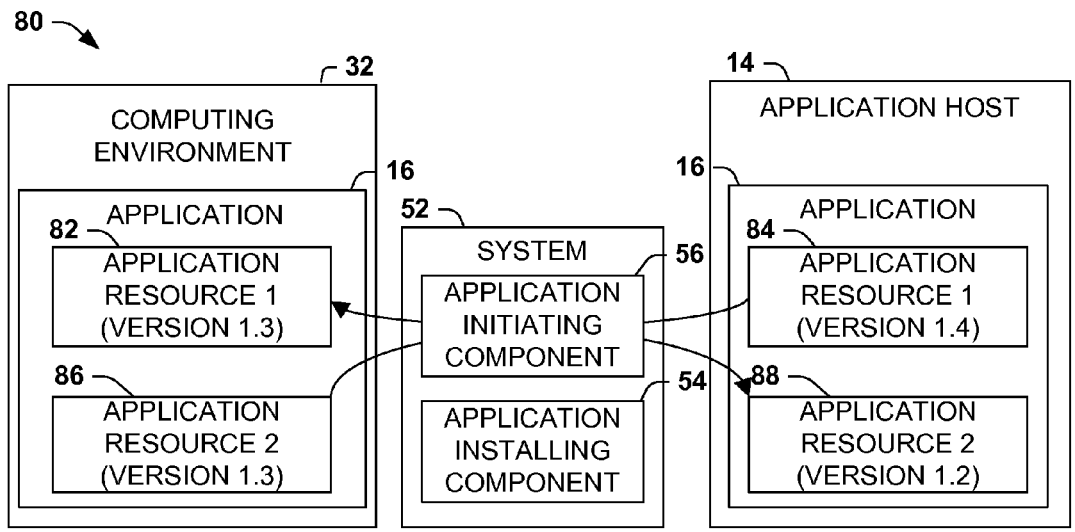
FIG. 7 is a component block diagram illustrating a synchronizing of application resources between a computing environment and an application host during an initiating of an application.

FIG. 7 illustrates an exemplary scenario 80 featuring an application host 14 hosting an application 16 that is also included in a computing environment 32. The application 16 includes a first application resource and a second application resource, and the application 16 is initially installed in the computing environment 32 by the application installing component 54 that retrieves the application resources 18 and stores them in the computing environment 32. It may happen that the first application resource is subsequently updated at the application host 14. Accordingly, when the application initiating component 56 application 16 initiates the application 16 in a connected context, the application initiating component 56 may endeavor to identify a later updated application resource at the application host 14 as compared with a corresponding application resource in the computing environment 32. Upon identifying such a later updated application resource (e.g., a later updated first application resource 84, as compared with the corresponding first application resource 82 in the computing environment 32), the application initiating component 56 may request the later updated application resource, and upon receiving the later updated application resource, may replace the application resource in the computing environment 32. The application initiating component 56 may then initiate the application 16 within the virtual environment 20 with the later updated application resource. Conversely, the application initiating component 56 may endeavor to identify a later updated application resource in the computing environment 32 as compared with a corresponding application resource at the application host 14. Upon identifying such a later updated application resource (e.g., a later updated second application resource 86, as compared with the corresponding second application resource 88 at the application host 14), the application initiating component 56 may send the later updated application resource to the application host 14. In this manner, the application initiating component 52 may promote the synchronization of the representations of the application resources in the computer and at the application host 14. Those of ordinary skill in the art may devise many techniques for executing an application with respect to a particular application host connection context of an application host while implementing the techniques discussed herein.

A second aspect that may vary among embodiments of these techniques relates to the nature of the computing environment, and in particular if the computing environment comprises a deployable computing environment. It may be appreciated that the computing environment of an individual may comprise a robust and diverse set of data objects. For example, a computing environment may comprise a set of files managed by a file system, one or more databases managed by a database system, a set of executable binaries representing applications and managed by an assembly cache, a set of user profiles managed by a user profile component of an operating system, and various data caches managed by data caching components, such as a set of copied items managed by a copy buffer of the operating system, a set of undo actions managed by an undo component of the operating system, and a set of "most recently used" items managed by an item usage tracking component of the operating system. Moreover, such data objects may be exchanged among a plurality of devices operated by one or more users, and according to one or more operations (e.g., an object synchronization operation that merges two data object sets and a data object mirroring operation that adjusts a target data object set to match a source data object set.) In this manner, the objects are loosely organized through a set of object systems and aggregated to represent the computing environment.

In order to reduce the complex variety and decentralization of the objects comprising a contemporary computing environment, a deployable representation of the computing environment may be devised, where the objects comprising the computing environment are organized in a data object hierarchy, which may be hosted by a computing environment host. If the data objects are represented in a uniform manner and managed in a consistent way by a data object system, a set of services may be devised to apply to all of the data objects of the computing environment. Moreover, the data object hierarchy may be delivered to various devices to represent the same computing environment (including the same user profiles, applications, data files, etc.), and each device may render the computing environment in a consistent manner but customized based on the capabilities of the device (e.g., a hard keyboard interface for receiving data entry from a keyboard device attached to a workstation, and a touchscreen software keyboard interface for receiving data entry from a cellphone device.) With relation to the concept of a deployable computing environment, it may be advantageous to configure at least one server to manage one or more data objects within the representation, and to accept operations sets to be applied to such data objects. A user of the deployable computing environment may therefore interact with the deployable computing environment in a platform- and device-independent manner, while also achieving at least some of the advantages over alternative accessing techniques, such as synchronous or asynchronous invoking, batching of standard operations, and mobile agents. However, those of ordinary skill in the art may devise many such scenarios in which the techniques discussed herein may be applied.

Figure 8:
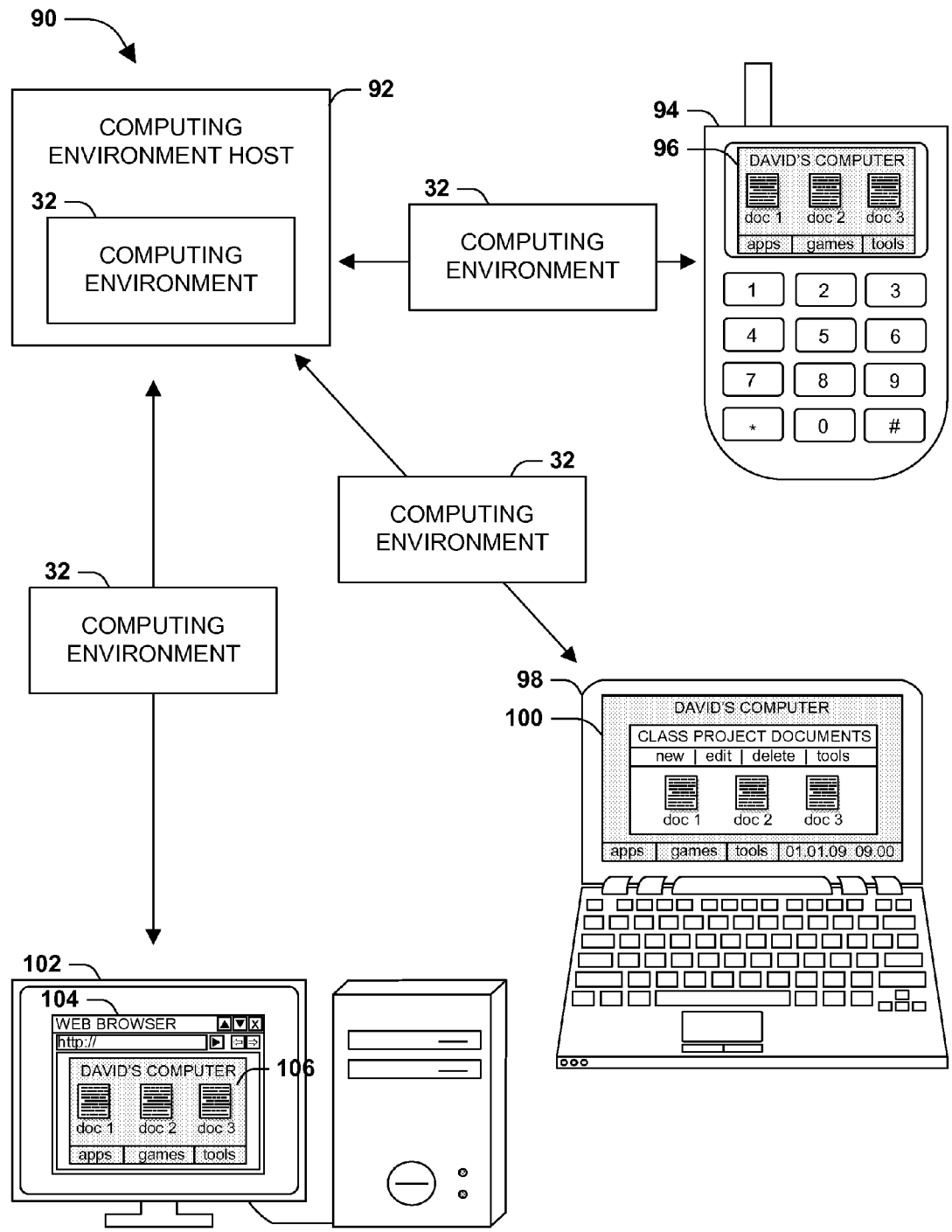
FIG. 8 is an illustration of an exemplary interaction of a computing environment host with various computing environment rendering devices.

FIG. 8 illustrates one such scenario 90, wherein the computing environment may be hosted by a computing environment host 92, which may store and manage a computing environment 32. The computing environment host 92 may also render the computing environment 32 in different ways on behalf of various devices, such as a cellphone device 94, a personal notebook computer 98, and a public workstation 102, and also on behalf of different types of users having different access privileges. The rendering of the computing environment therefore reflects a consistent computing environment across all devices that expose the same applications, user profiles, shell configuration, user data objects, etc. Thus, a user may access a full-featured version 100 of the computing environment through a high-performance notebook computer, a stripped-down version 96 of the computing environment on a low-power cellphone device 94, and a browser-compatible and privacy-oriented version 106 of the computing environment through a web browser 94 of a public terminal 102. To the extent that the capabilities of each such device support the rendering of the computing environment, a consistent user interface and data set may be presented due to the rendering of the computing environment 32 adjusted to the capabilities of each device. Updates to the computing environment may be propagated back to the computing environment host 92, and may be automatically synchronized with other devices. The various devices may also cooperate by sharing locally stored data with other devices, and by controlling or being controlled by other devices. Hence, the computing environment may therefore be devised and presented as a cloud computing architecture, comprising a device-independent representation (a "cloud") expressed as a consistent rendering across all devices ("clients") that form a mesh of cooperating portals (with device-specific properties) to the same computing environment. Specifically with respect to the applications of the computing environment, the computing environment 32 may include a representation of the application set, the application resources, and the data objects created thereby. Moreover, the computing environment host 92 may apply services to the various objects comprising the computing environment 32, and the common format in which the data objects are stored in the computing environment 32 may facilitate consistent availability and application of the services regardless of the nature of the data objects applied thereto.

If the computing environment 32 is devised in a deployable manner, then the configuration of an application 16 may be stored therein for execution within a virtual environment 20 in a manner that confers additional advantages. As a first such advantage, the services applied to the data objects comprising the computing environment 32 may be similarly applied to the application resources 18 comprising the application 16, such as automated synchronization across the various renderings of the computing environment 32 across various devices. As a second such advantage, these services may be implemented in a general-purpose manner applicable to all data objects in the computing environment 32, thereby avoiding the redundant implementation of such services by the virtual environment 20 and/or the application 16. Moreover, such services may be applied independently of the application 16 and the virtual environment 20, and even in the absence of an executing instance of either component, and may be applied in a consistent manner as with other data objects that may be stored in the computing environment 32.

As a first example, if the application 16 executes in a virtual environment (such as a web browser) on a personal notebook computer 98 in a manner that alters an application resource 18 (such as an email box), the alteration may be automatically propagated to the cellphone device 94 as part of the automated synchronization of the application resource 18 as a data object in the computing environment 32. This advantage may be more difficult to achieve, e.g., if the application resource 18 were stored in the virtual environment memory 42 (such as a browser cache), where the alteration might be more difficult to detect, and/or the matching of the representation of the application resource 18 in the virtual environment memory 42 of the personal notebook computer 98 with the corresponding representation of the application resource 18 in the virtual environment memory 42 of the cellphone device 94. As a second example, the application resource 18 may be more easily saved as an archival copy if stored in the computing environment 32, e.g., to the authoritative computing environment 32 stored by the computing environment host 92, than if the application resource 18 were stored in the virtual environment memory 20, where it may be difficult to differentiate data objects that are advantageously preserved from data objects that are ephemeral or of trivial archival value. As a third example, if the application 16 is installed on one device included in the computing environment 32, the application 16 may be automatically deployed to the other devices in the computing environment 32 by synchronizing the computing environment 32 across all such devices. This synchronization may cause the application resources 18 to be deployed to all such devices, thereby making the application 16 available in all of the devices comprising the computing environment of the user.

Figure 9:
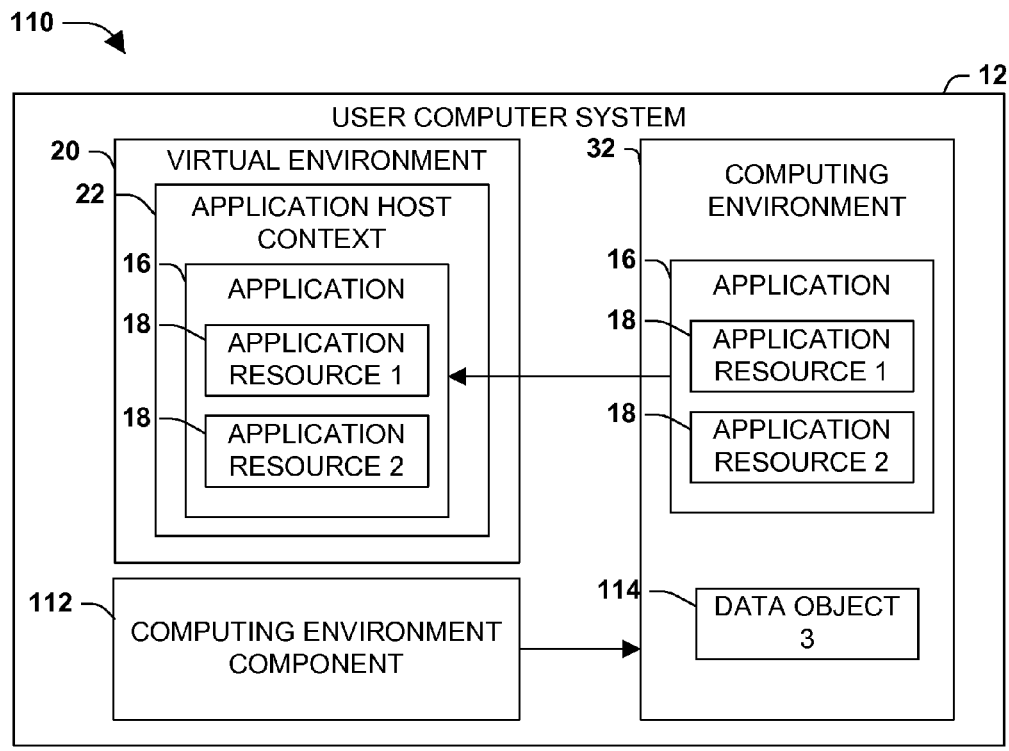
FIG. 9 is a component block diagram illustrating an application of various services by a computing environment component on the data objects of a computing environment.

These examples illustrate some of the advantages of storing the application resources 18 comprising an application 16 in a computing environment 32 that is configured in a deployable manner. FIG. 9 illustrates some examples in an exemplary scenario 110 featuring a computing environment components 12, which may execute on the computer outside of the virtual environment 20, and which may be configured to perform at least one application service on the application resources 18 stored in the computing environment 32. For example, the computing environment components 12 may apply to the application resources 18 a synchronization service that synchronizes various representations and versions of application resources 18 across various devices sharing the computing environment 32; an archiving service that archives the application resources 18, such as by synchronizing such application resources 18 with an authoritative computing environment 32 stored in the computing environment host 92; and a versioning service that automatically updates the application resources 18 with later updated instances of the corresponding application resources (e.g., such application resources 18 may be updated in the authoritative computing environment 32 stored by the computing environment host 92, and such updates may be automatically propagated to all devices sharing the computing environment 32 simply by synchronizing the computing environment 32 among such devices.)

Some specific examples may also be appreciated with reference to FIG. 9. As a first specific example, if the computing environment 32 includes a representation of at least one device having an application installing component 54, the computing environment components 12 may be configured to deploy the application 16 to the device simply by delivering the application resources 18 to the application installing component 54 of the device. As a second specific example, the application 16 might operate on at least one data object 114 stored in the computing environment 32 that is associated with a permission, e.g., a restricted data object to which only particular users are permitted access. The application 16 may therefore submit a permission credential, such as an authentication credential provided by the user that may be used to authenticate the identity of the user (e.g., a username and password combination.) The computing environment component 12 may therefore be configured to verify the permission using the at least one permission credential on behalf of the application 16, and may therefore perform the authorized operation while otherwise protecting access to the computing environment 32. In addition to these examples, those of ordinary skill in the art may devise many uses and advantages of storing the application resources 18 of the application 16 in a deployable computing environment 32 while implementing the techniques discussed herein.

A third aspect that may vary among embodiments of these techniques relates to applications that are configured to store application resources in a virtual environment memory of the virtual environment (such as a browser cache of a web browser.) Notwithstanding the advantages of storing application resources in the computing environment, an application that executes in a virtual environment may nevertheless be configured to store one or more application resources in the virtual environment memory of the virtual environment. While the application might be advantageously redesigned, in some instances a redesign may not be feasible or desirable (e.g., where the source code of the application is unavailable.)

Many techniques may be used to confer the advantages of storing the application resources in the computing environment without reconfiguring or redesigning the application. As a first example, the virtual environment may be reconfigured to store such application resources as data objects in the computing environment instead of in the isolated virtual memory environment, and to redirect accesses for such application resources to the corresponding data objects in the virtual environment representation. This storing and redirecting might be specific to a particular application, or might be applicable to some or all of the applications installed in the virtual environment memory.

Figure 10:
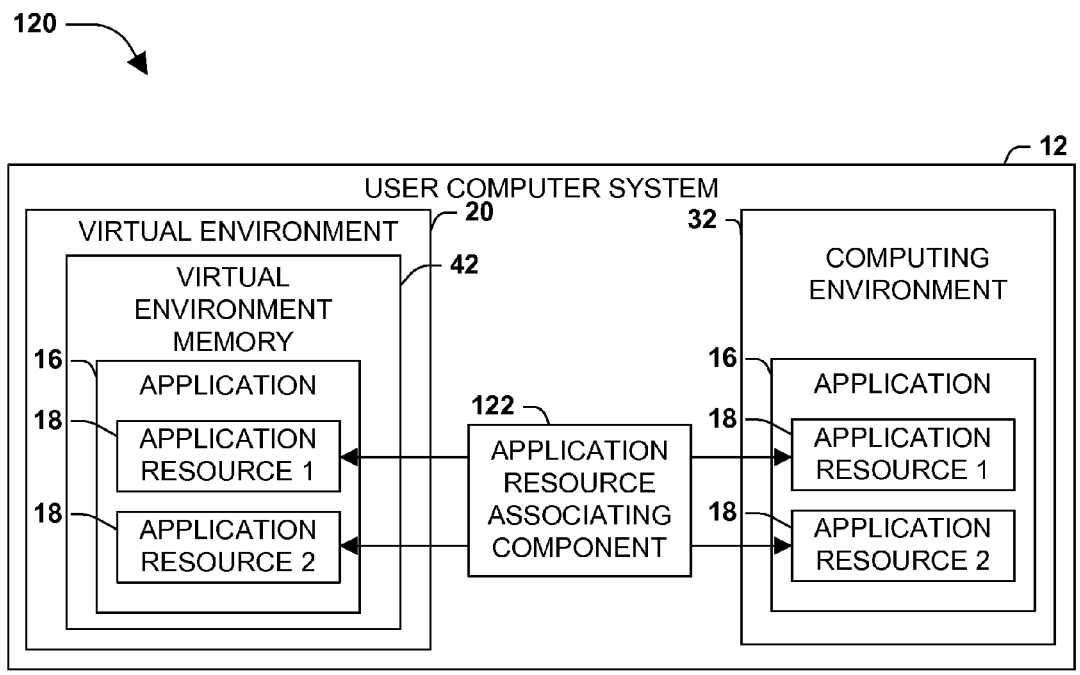
FIG. 10 is a component block diagram illustrating a synchronization of corresponding application resources stored in a virtual environment memory and in a computing environment.

FIG. 10 illustrates a second example of this third aspect, featuring an exemplary scenario 120 wherein the computer 12 includes a virtual environment 20 having a virtual environment memory 42 wherein the application resources 18 comprising an application 16 are stored. This computer 12 also includes an application resource associating component 122, which may be configured to associate respective application resources 18 stored in the virtual environment memory 42 with corresponding application resources 18 stored in the computing environment 32. For example, when the application resources 18 are installed in the virtual environment memory 42, the application resource associating component 122 may store corresponding instances of the application resources 18 in the computing environment 32, and may form an association between such corresponding application resources 18. Moreover, the application resource associating component 122 may facilitate the synchronization of the corresponding instances of the application resources 18. As a first example, if the application resource associating component identifies a later updated application resource 18 stored in the virtual environment memory 42 than a corresponding application resource 18 stored in the computing environment 32, the application resource associating component 122 may replace the application resource 18 stored in the computing environment 32 with the later updated application resource 18. Conversely, if the application resource associating component identifies a later updated application resource 18 stored in the computing environment 32 than a corresponding application resource 18 stored in the virtual environment memory 42, the application resource associating component 122 may replace the application resource 18 stored in the virtual environment memory 42 with the later updated application resource 18. In this manner, the advantages of storing application resources 18 in the computing environment 32 may be conferred upon this application 16 without reconfiguration. However, those of ordinary skill in the art may devise many techniques for conferring the advantages of storing the application in the computing environment 32 instead of the virtual environment memory 42 while implementing the techniques discussed herein.

A fourth aspect that may vary among implementations of these techniques relates to additional advantages that may be included in various embodiments. As a first example, rather than installing the application 16 in an automated manner, an application installing component 54 may request a user permission to install the application 16, and may store the application resources 18 in the computing environment 32 only after receiving such user permission. In addition, the application installing component 54 may permit the user to customize the installation of the application 16 according to various preferences, such as extending permission to the application 16 to access a particular portion of the computing environment 32 and associating the application 16 with particular types of data objects. As a second example, the application installing component 54 may customize the installing of the application according to at least one detail of the computer 12. For example, the application installing component 54 may endeavor to detect at least one computer capability relating to the computer 12 (e.g., the presence or absence of an audio output device), and may request from the application host 14 a version of application resources that relates to the at least one computer capability (e.g., a version of the application featuring audio output or omitting audio output.) Those of ordinary skill in the art may devise many additional features that may be included in implementations of the techniques provided herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 11:
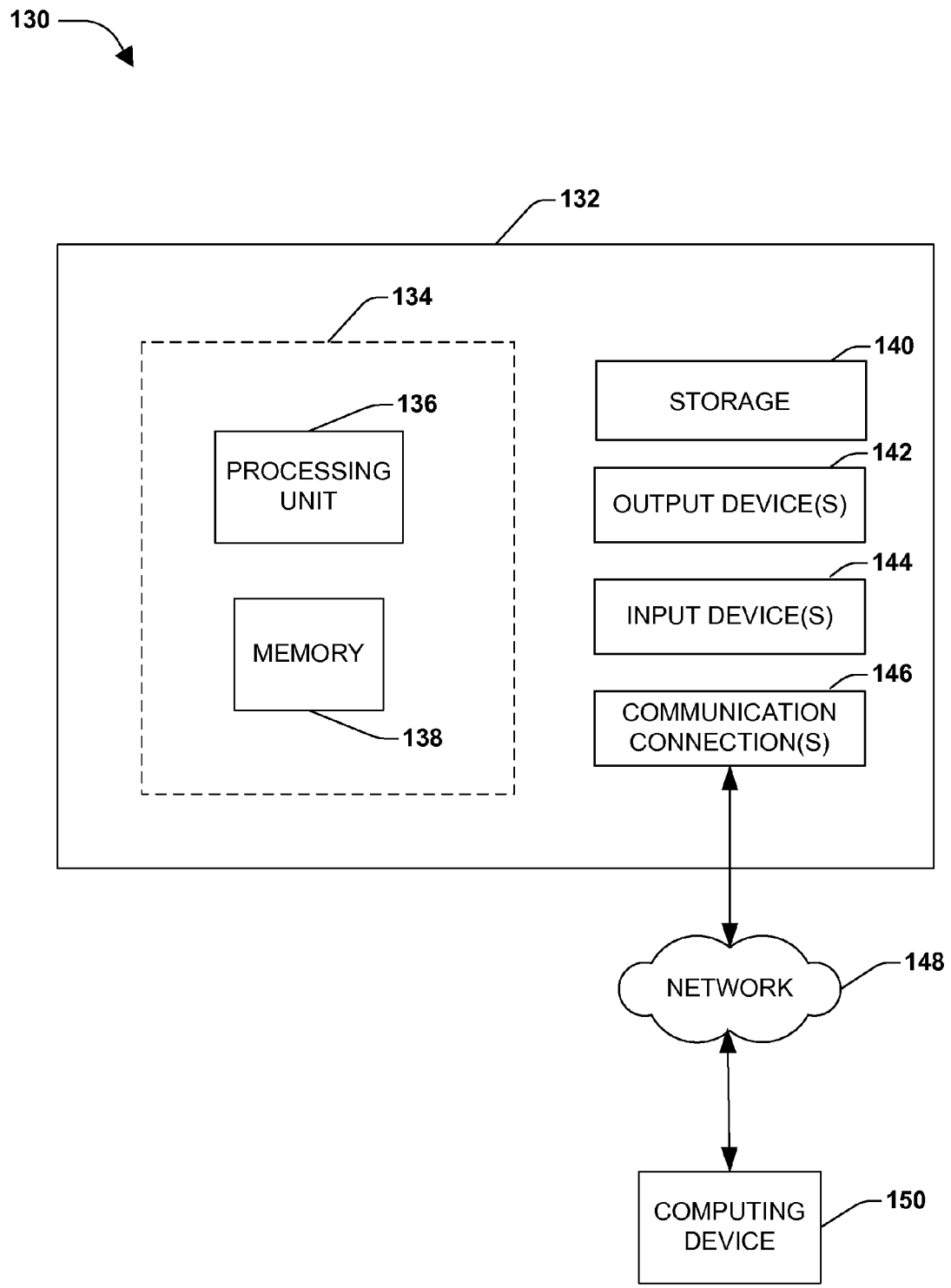
FIG. 11 illustrates an exemplary computing environment wherein one or more of the provisions set forth herein may be implemented.

FIG. 11 and the following discussion provide a brief, general description of a suitable computing environment to implement embodiments of one or more of the provisions set forth herein. The operating environment of FIG. 11 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 11 illustrates an example of a system 130 comprising a computing device 132 configured to implement one or more embodiments provided herein. In one configuration, computing device 132 includes at least one processing unit 136 and memory 138. Depending on the exact configuration and type of computing device, memory 138 may be volatile (such as RAM, for example), non-volatile (such as ROM, flash memory, etc., for example) or some combination of the two. This configuration is illustrated in FIG. 11 by dashed line 134.

In other embodiments, device 132 may include additional features and/or functionality. For example, device 132 may also include additional storage (e.g., removable and/or non-removable) including, but not limited to, magnetic storage, optical storage, and the like. Such additional storage is illustrated in FIG. 11 by storage 140. In one embodiment, computer readable instructions to implement one or more embodiments provided herein may be in storage 140. Storage 140 may also store other computer readable instructions to implement an operating system, an application program, and the like. Computer readable instructions may be loaded in memory 138 for execution by processing unit 136, for example.

The term "computer readable media" as used herein includes computer storage media. Computer storage media includes volatile and nonvolatile, removable and non-removable media implemented in any method or technology for storage of information such as computer readable instructions or other data. Memory 138 and storage 140 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 132. Any such computer storage media may be part of device 132.

Device 132 may also include communication connection(s) 146 that allows device 132 to communicate with other devices. Communication connection(s) 146 may include, but is not limited to, a modem, a Network Interface Card (NIC), an integrated network interface, a radio frequency transmitter/receiver, an infrared port, a USB connection, or other interfaces for connecting computing device 132 to other computing devices. Communication connection(s) 146 may include a wired connection or a wireless connection. Communication connection(s) 146 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 132 may include input device(s) 144 such as keyboard, mouse, pen, voice input device, touch input device, infrared cameras, video input devices, and/or any other input device. Output device(s) 142 such as one or more displays, speakers, printers, and/or any other output device may also be included in device 132. Input device(s) 144 and output device(s) 142 may be connected to device 132 via a wired connection, wireless connection, or any combination thereof. In one embodiment, an input device or an output device from another computing device may be used as input device(s) 144 or output device(s) 142 for computing device 132.

Components of computing device 132 may be connected by various interconnects, such as a bus. Such interconnects may include a Peripheral Component Interconnect (PCI), such as PCI Express, a Universal Serial Bus (USB), firewire (IEEE 1332), an optical bus structure, and the like. In another embodiment, components of computing device 132 may be interconnected by a network. For example, memory 138 may be comprised of multiple physical memory units located in different physical locations interconnected by a network.

Those skilled in the art will realize that storage devices utilized to store computer readable instructions may be distributed across a network. For example, a computing device 150 accessible via network 148 may store computer readable instructions to implement one or more embodiments provided herein. Computing device 132 may access computing device 150 and download a part or all of the computer readable instructions for execution. Alternatively, computing device 132 may download pieces of the computer readable instructions, as needed, or some instructions may be executed at computing device 132 and some at computing device 150.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of managing execution of an application on a device having a processor, the method comprising:
   executing on the processor instructions configured to:
   responsive to receiving an application resource to be stored on the device:
   store the application resource; and
   store, for the application resource, a record indicating the application host to which the application resource is restricted; and
   responsive to receiving from the application a request to access a requested application resource stored on the device:
   retrieve the record indicating the application host to which the requested application resource is restricted;
   determine whether the application is permitted to access application resources restricted to the application host of the requested application resource;
   responsive to determining that the application is permitted to access application resources restricted to the application host of the requested application resource, permit the application to access the requested application resource; and responsive to determining that the application is not permitted to access application resources restricted to the application host of the requested application resource, restrict the application from accessing the requested application resource.

2. The method of claim 1, the instructions further configured to initiate the application in an application host connection status selected from a set of application host connection statuses comprising a connected status and a disconnected status.

3. The method of claim 2, initiating the application comprising:
   detect a connection status of the application host comprising at least one of a connected status and a disconnected status;
   responsive to detecting a connected connection status, initiating the application within an isolation boundary of the application host with the at least one application resource with a connected status; and
   responsive to detecting failing to contact the application host, initiating the application within the isolation boundary of the application host with the at least one application resource with a disconnected status.

4. The method of claim 2, the instructions further configured to:
   after initiating the application, detect a changed connection status of an application host associated with the application; and
   responsive to detecting the changed connection status, update the application host connection status of the application.

5. The method of claim 2:
   the device further comprising a memory; and
   the instructions further configured to:
      receive from the application host a local representation of at least one application resource;
      store the local representation of the at least one application resource in the memory of the device;
      responsive to initiating the application in a connected status:
         retrieve the at least one application resource from the application host, and
         initiate the application within an isolation boundary of the application host with the at least one application resource retrieved from the application host; and
      responsive to initiating the application in a disconnected status:
         retrieve the local representation of the at least one application resource from the memory of the device, and
         initiate the application within the isolation boundary of application host with the local representation of the at least one application resource.

6. The method of claim 2:
   the device further comprising a memory storing application resources; and
   the instructions further configured to, responsive to initiating the application in a connected context:
      for respective application resources, identify a later updated application resource available through the application host than a corresponding application resource in the memory of the device, and
      responsive to identifying the later version:
         request the later updated application resource from the application host, and
         responsive to receiving the later updated application resource from the application host:
            replace the application resource in the memory of the device with the later updated application resource, and
            initiate the application within the isolation boundary of the application host with the later updated application resource.

7. The method of claim 6, the instructions further configured to, upon initiating the application in a connected context:
   for respective application resources, identify a later versioned application resource stored in the memory of the device than a corresponding application resource available through the application host; and
   responsive to identifying the later versioned application resource, send the later versioned application resource to the application host.

8. The method of claim 1, wherein the application is executed within a computing environment deployed to the device by a computing environment host.

9. The method of claim 8, the instructions further configured to execute the computing environment outside of a virtual environment and configured to perform at least one application service on the at least one application resource stored in the computing environment.

10. The method of claim 9:
    the application comprising at least one operation on at least one data object of the computing environment associated with a permission comprising at least one permission credential, and
    the computing environment configured to verify the permission using the at least one permission credential on behalf of the application.

11. The method of claim 9:
    the computing environment including a representation of at least one device having an application installing component, and
    the computing environment configured to deploy the application to the at least one device by delivering the at least one application resource to the application installing component of the device.

12. The method of claim 1:
    the device further comprising a memory storing application resources; and
    the application configured to store at least one application resource within the memory in a virtual environment memory associated with a virtual environment within which the application is executed.

13. The method of claim 12, the instructions further configured to associate at least one application resource stored in the virtual environment memory with at least one corresponding application resource stored in the memory of the device.

14. The method of claim 13, the instructions further configured to:
    for respective application resources, identify a later updated application resource stored in the virtual environment memory than a corresponding application resource stored in the memory of the device; and
    responsive to identifying the later updated application resource, replacing the application resource stored in the memory of the device with the later updated application resource.

15. The method of claim 13, the instructions further configured to:
- for respective application resources, identify a later updated application resource stored in the memory of the device than a corresponding application resource stored in the virtual environment memory; and
- responsive to identifying the later updated application resource, replacing the application resource stored in the virtual environment memory with the later updated application resource.

16. The method of claim 1:
- the at least one application resource comprising an application installing package, and
- the instructions further configured to install the application on at least one device by delivering the application installing package to the at least one device.

17. The method of claim 1:
- the device further comprising a memory storing application resources; and
- storing the at least one application resource comprising:
    - requesting a user permission to install the application, and
    - responsive to receiving the user permission, installing the at least one application resource in the memory of the device.

18. The method of claim 1, receiving the at least one application resource comprising:
- detecting at least one computer capability relating to the computer, and
- requesting from the application host a version of the at least one application resource relating to the at least one computer capability.

19. A device that manages execution of an application comprising at least one application resource, the device comprising:
- a processor; and
- a memory storing instructions that, when executed by the processor, provide a system comprising:
    - an application resource store that, responsive to receiving an application resource to be stored on the device:
        - stores the application resource in the computing environment; and
        - stores, for the application resource, a record indicating the application host to which the application resource is restricted; and
    - an application execution environment that, responsive to receiving from the application a request to access a requested application resource stored on the device:
        - retrieve the record indicating the application host to which the requested application resource is restricted;
        - determine whether the application is permitted to access application resources restricted to the application host of the requested application resource;
        - responsive to determining that the application is permitted to access application resources restricted to the application host of the requested application resource, permitting the application to access the requested application resource; and
        - responsive to determining that the application is not permitted to access application resources restricted to the application host of the requested application resource, restricting the application from accessing the requested application resource.

20. A system that causes a computer comprising a memory device to manage execution of an application, the system comprising:
- an application resource store comprising instructions stored in the memory device that, when executed on the processor, cause the computer to, responsive to receiving an application resource:
    - store the application resource in the computing environment; and
    - store, for the application resource, a record indicating the application host to which the application resource is restricted; and
- an application execution environment comprising instructions stored in the memory device that, when executed on the processor, cause the computer to, responsive to receiving from the application a request to access a requested application resource:
    - retrieve the record indicating the application host to which the requested application resource is restricted;
    - determine whether the application is permitted to access application resources restricted to the application host of the requested application resource;
    - responsive to determining that the application is permitted to access application resources restricted to the application host of the requested application resource, permit the application to access the requested application resource; and
    - responsive to determining that the application is not permitted to access application resources restricted to the application host of the requested application resource, restrict the application from accessing the requested application resource.

\* \* \* \* \*